(12) United States Patent
Wu et al.

(10) Patent No.: US 7,298,793 B2
(45) Date of Patent: Nov. 20, 2007

(54) METHOD AND APPARATUS FOR I/Q MISMATCH CALIBRATION OF TRANSMITTER

(75) Inventors: Kuo-Ming Wu, Hsinchu (TW);
Mao-Ching Chiu, Hsinchu (TW);
Jui-Hsi Cheng, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 781 days.

(21) Appl. No.: 10/645,107

(22) Filed: Aug. 21, 2003

(65) Prior Publication Data

US 2005/0041754 A1 Feb. 24, 2005

(51) Int. Cl.
*H04K 1/02* (2006.01)
*H04L 25/03* (2006.01)
*H04L 25/49* (2006.01)

(52) U.S. Cl. ............... 375/296; 455/114.3; 455/115.1; 455/67.11

(58) Field of Classification Search ............... 375/224, 375/260, 261, 285, 295, 296, 298; 455/126, 455/283, 284, 115–116, 114.3, 114.2, 67.11
See application file for complete search history.

(56) References Cited

U.S. PATENT DOCUMENTS

| | | | | |
|---|---|---|---|---|
| 6,009,317 A | * | 12/1999 | Wynn | ............... 455/296 |
| 6,208,698 B1 | | 3/2001 | Marchesani et al. | ......... 375/298 |
| 6,240,142 B1 | * | 5/2001 | Kaufman et al. | ............ 375/261 |
| 6,377,620 B1 | * | 4/2002 | Ozluturk et al. | ............ 375/235 |
| 6,895,045 B2 | * | 5/2005 | Ozluturk et al. | ............ 375/235 |
| 6,901,121 B1 | * | 5/2005 | Dubrovin et al. | ........... 375/346 |
| 6,977,977 B1 | * | 12/2005 | Dubrovin et al. | ........... 375/346 |
| 7,035,345 B2 | * | 4/2006 | Jeckeln et al. | .............. 375/296 |
| 7,065,154 B2 | * | 6/2006 | Ylamurto | .................... 375/296 |
| 2002/0015450 A1 | | 2/2002 | Ratto | ........................ 375/261 |

\* cited by examiner

*Primary Examiner*—Jean B. Corrielus
(74) *Attorney, Agent, or Firm*—Thomas, Kayden, Horstemeyer & Risley

(57) ABSTRACT

A method for I/Q mismatch calibration of a transmitter. First, a discrete-time signal is generated. Next, a corrected signal based on the discrete-time signal and a set of correction parameters $A_p$ and $B_p$ is obtained. Next, the corrected signal is converted to an analog corrected signal. Next, I/Q modulation is applied to the analog corrected signal and outputs a modulated signal. Next, a first, second, and third desired component measures and a first, second, and third image component measures with the first, second and third sets of the correction parameters $A_p$ and $B_p$ are respectively obtained from the modulated signal. Next, a fourth and fifth set of correction parameters $A_p$ and $B_p$ are obtained based on the first, the second, and the third desired component measures as well as the first, the second, and the third image component measures. Next, a fourth desired component measure and a fourth image component measure with the fourth set of correction parameters $A_p$ and $B_p$ and a fifth desired component measure and a fifth image component measure with the fifth set of correction parameters $A_p$ and $B_p$ are obtained from the modulated signal. Finally, a final set of the correction parameters $A_p$ and $B_p$ are selected from the fourth and fifth sets of correction parameters.

24 Claims, 5 Drawing Sheets ns that result in an imperfect match between the two baseband analog signals, I and Q, which represent the complex carrier. For example, gain mismatch might cause the I signal to be slightly different from the Q. In a single-carrier modulation system, this results in a visible distortion in the constellation—the square constellation of a 64-QAM signal would become rectangular.

METHOD AND APPARATUS FOR I/Q MISMATCH CALIBRATION OF TRANSMITTER

BACKGROUND OF THE INVENTION

The present invention relates to compensation of physical layer impairments on transmitter systems and particularly to a method and apparatus for I/Q mismatch calibration in transmitter systems.

DESCRIPTION OF THE RELATED ART

OFDM is a multi-channel modulation system employing Frequency Division Multiplexing (FDM) of orthogonal sub-carriers, each modulating a low bit-rate digital stream. The simplest way to describe an orthogonal frequency-division multiplexing (OFDM) signal is as a set of closely spaced frequency-division multiplexed carriers. While this is a good starting point for those unfamiliar with the technology, it falls short as a model for analyzing the effects of signal impairment.

The reason it falls short is that the carriers are more than closely spaced; they are heavily overlapped. In a perfect OFDM signal, the orthogonality property prevents interference between overlapping carriers. This is different from the FDM systems. In FDM systems, any overlap in the spectrums of adjacent signals will result in interference. In OFDM systems, the carriers will interfere with each other only if there is a loss of orthogonality. So long as orthogonality can be maintained, the carriers can be heavily overlapped, allowing increased spectral efficiency.

Table 1 lists a variety of common analog signal impairments and their effects on both OFDM signals and the more familiar single-carrier modulations such as quadrature phase-shift keying (QPSK) or 64-QAM (quadrature amplitude modulation). Most of these impairments can occur in either the transmitter or the receiver.

To better understand how gain imbalance will affect an OFDM signal, look at the equations describing each individual sub-carrier. In the following analysis, it's important to keep in mind that, while an individual sub-carrier is analyzed, the I/Q gain imbalance error is on the signal that is the composite of all sub-carriers.

In the equation (1), $C_{k,m}$ is a complex number representing the location of the symbol within the constellation for the kth sub-carrier at the mth symbol time. For example, if sub-carrier k is binary-phase-shift-keying (BPSK) modulated, then $C_{k,m}$ might take on values of $\pm 1+j0$. The complex exponential portion of equation (1) represents the kth sub-carrier, which is amplitude- and phase-modulated by the symbol $C_{k,m}$. Therefore:

$$C_{k,m}(e^{j2\pi k \Delta ft}) \quad (1)$$

where $\Delta f$ is the frequency space between the sub-carrier. Using Euler's relation, the equation (1) can be rewritten as:

$$C_{k,m}(\cos(2\pi \cdot k\Delta ft) + j\sin(2\pi \cdot k\Delta ft)) \quad (2)$$

Now add a term "β" to represent gain imbalance. For a perfect signal, set β=0. As shown, the gain imbalance term will also produce a gain change. This was done to simplify the analysis. Therefore:

$$C_{k,m}((1+\beta)\cos(2\pi \cdot k\Delta ft) + j\sin(2\pi \cdot k\Delta ft)) \quad (3)$$

The equation can be rearranged and this can be rewritten as the sum of a perfect signal and an error signal:

$$C_{k,m}(\cos(2\pi \cdot k\Delta ft) + j\sin(2\pi \cdot k\Delta ft)) + C_{k,m}\beta\cos(2\pi \cdot k\Delta ft) \quad (4)$$

Finally, converting back into complex exponential notation, we get:

$$C_{k,m}e^{j2\pi k\Delta ft} + \left(C_{k,m}\frac{\beta}{2}\right)\cdot(e^{j2\pi k\Delta ft} + e^{-j2\pi k\Delta ft}) \quad (5)$$

| Impairment | OFDM | QPSK |
|---|---|---|
| I/Q gain balance | State spreading (uniform/carrier) | Distortion of constellation |
| I/Q quadrature skew | State spreading (uniform/carrier) | Distortion of constellation |
| I/Q channel mismatch | State spreading (non-uniform/carrier) | State spreading |
| Uncompensated frequency error | State spreading | Spinning constellation |
| Phase noise | State spreading (uniform/carrier) | Constellation phase arcing |
| Nonlinear distortion | State spreading | State spreading |
| Linear distortion | Usually no effect (equalized) | State spreading if not equalized |
| Carrier leakage | Offset constellation for center carrier only (if used) | Offset constellation |
| Frequency error | State spreading | Constellation phase arcing |
| Amplifier droop | Radial constellation distortion | Radial constellation distortion |
| Spurious | State spreading or shifting of affected sub-carrier | State spreading, generally circular |

For cost reasons, analog in-phase and quadrature (I/Q) modulators and demodulators are often used in transceivers especially for wide bandwidth signals. Being analog, these I/Q modulators and demodulators usually have imperfec- In words, the equation (5) shows that a gain imbalance produces two error terms. The first error term is at the frequency of the kth sub-carrier. The second error term is at the frequency of the –kth sub-carrier. The phase and magnitude of the error terms are proportional to the symbol being transmitted on the kth sub-carrier. Another way of saying this is that I/Q gain imbalance will result in each sub-carrier being interfered with by its frequency mirror-image sub-carrier. Persons skilled in the art will instantly recognize this as imperfect sideband cancellation.

The equation (5) has several implications. First, it is generally true that for sub-carriers used to carry data (as opposed to pilots), the symbol being transmitted at any given time on the kth sub-carrier is uncorrelated to the symbol on the –kth sub-carrier.

For a given sub-carrier, the lack of correlation from the mirror-image sub-carrier implies a certain randomness to the error. This results in a spreading of the sub-carrier's constellation states in a noise-like fashion. This is especially true for higher-order modulations such as 64-QAM. For lower-order modulations, such as BPSK, the error term from the mirror-image carrier has fewer states.

This can result in constellations where the BPSK pilot carriers of an 802.11a signal exhibit spreading that does not appear noise-like. Also, as the BPSK pilots do not have an imaginary component; the error terms associated with the pilot sub-carriers are real—so the spreading is only along the real (I) axis. Note that the phase relationships between the pilot carriers in an 802.11a system are highly correlated, so the errors introduced by quadrature errors are not random.

Quadrature skew produces error terms similar to those produced by gain imbalance. Quadrature skew occurs when the two oscillators used in an I/Q modulator or demodulator do not differ by exactly 90°. For a small angular error, it can be shown that the resulting error is orthogonal to the data. This is indicated by the j in front of the error terms in the equation (6). As with gain imbalance, the error generates energy at the kth and –kth sub-carriers. Again, the 802.11a BPSK pilots do not have an imaginary component, so the error term, which is now orthogonal, causes spreading along the Q axis. For the QPSK carriers in this example, the error is also orthogonal. However, unlike BPSK, a QPSK constellation doesn't look any different when rotated by 90°. (See the equation (6)):

$$C_{k,m}e^{j2\pi k\Delta ft} + j\frac{C_{k,m}\phi}{2} \cdot (e^{j2\pi k\Delta ft} + e^{-j2\pi k\Delta ft}) \qquad (6)$$

In both 802.11a and Hiperlan2, a channel estimation sequence is transmitted at the beginning of a burst. This special sequence is used to train the receiver's equalizer. The intended function of the equalizer is to compensate the received signal for multi-path distortion a linear impairment in the signal that is the result of multiple signal paths between the transmitter and the receiver. As the ideal channel estimation sequence is known by the receiver, the receiver can observe the effects of the channel on the transmitted signal and compute a set of equalizer coefficients.

In the transmitter, the channel estimation sequence is created by BPSK modulating all 52 carriers for a portion of the preamble. Not coincidentally, the equalizer consists of 52 complex coefficients—one for each sub-carrier. It should come as no surprise that each sub-carrier in the channel estimation sequence has the greatest influence on the equalizer coefficient computed for that same sub-carrier.

The channel estimation sequence, and the receiver algorithms that compute the equalizer coefficients, are not immune from signal impairments. Consider, for example, the effect of I/Q gain imbalance on sub-carriers +26 and –26 of the channel estimation sequence. Recall from equation (5) that each sub-carrier has two error terms: one at the same frequency as the sub-carrier, and one at the mirror image frequency. The I/Q gain imbalance will cause mutual interference between sub-carriers +26 and –26.

From the IEEE 802.11a standard, the sub-carrier modulation for the channel estimation sequence is defined to be $C_{-26}=1+j0$ and $C_{+26}=1+j0$. Using these values in equation (5), one can easily determine that the two sub-carriers, when combined with the resulting error terms, will suffer an increase in amplitude. The equalizer algorithm will be unable to differentiate the error from the actual channel response, and will interpret this as a channel with too much gain at these two sub-carrier frequencies. The equalizer will incorrectly attempt to compensate by reducing the gain on these sub-carriers for subsequent data symbols.

The result will be different for other sub-carrier pairs, depending on the BPSK channel estimation symbols assigned to each.

With QPSK sub-carriers, the equalizer error caused by gain imbalance, or quadrature skew, results in seven groupings in each corner. Each QPSK sub-carrier suffers from QPSK interference from its mirror image. This results in a spreading to four constellation points in each corner. Each QPSK sub-carrier also suffers from a bi-level gain error introduced by the equalizer. This would produce eight groupings, except that the gain error is such that corners of the groupings overlap at the ideal corner state. Only seven groupings are visible.

I/Q Channel Mismatch

When the frequency response of the baseband I and Q channel signal paths are different, an I/Q channel mismatch exists. I/Q channel mismatch can be modeled as a sub-carrier-dependent gain imbalance and quadrature skew. I/Q gain imbalance and quadrature skew, as described above, are simply a degenerate form of I/Q channel mismatch in which the mismatch is constant over all sub-carriers. Think of channel mismatch as gain imbalance and quadrature skew as a function of a sub-carrier. It is still generally true that channel mismatch causes interaction between the kth and –kth sub-carriers, but that the magnitude of the impairment could differ between the kth and the (k+n)th carriers.

In order to eliminate the effects of the previously described impairments on the OFDM systems, various kinds of compensation circuits and methods have been proposed.

U.S. Application Publication No. 20020015450 discloses a method and an arrangement for determining correction parameters used for correcting phase and amplitude imbalance of an I/Q modulator in a transmitter. The transmitter includes an I/Q modulator and a corrector for correcting the phase and amplitude imbalance caused by the I/Q modulator. The arrangement has means for sampling the I/Q-modulated test signal to be transmitted, means for A/D-converting the signal samples taken from the test signal, means for I/Q-demodulating the signal samples digitally into I- and Q-feedback signals, means for determining the phase and amplitude imbalance caused by the I/Q modulator on the basis of the I- and Q-feedback signals, and means for determining the correction parameters of phase and amplitude on the basis of the determined phase and amplitude imbalance.

U.S. Pat. No. 6,208,698 discloses a quadrature modulator controlled by an imbalance estimator, as shown in FIG. 1. The estimator is entirely analog and includes two mixers 120, 121 to which are applied two carrier signals P1 and P2 derived from a carrier signal P obtained from a local oscillator and from a 90° phase-shifter 122. A modulating signal X, Y is applied to each of the mixers 120, 121. The output signals of the mixers 120, 121 are applied to a combiner 123 to constitute a modulated signal S. The modulated signal S is either an intermediate frequency signal or a microwave frequency signal. The estimator 124 of the invention includes means 125 for detecting the instantaneous power Pd of the modulated signal S, means 126, 127 for multiplying the detected instantaneous power Pd by each of the modulating signals X, Y, means 128A, 129A for rectifying the signals produced, which rectifier means can be diodes, for example, and means 130, 131 for integrating the rectified signals, the integrator means being followed by subtractors 160, 161 supplying respective signals E1 and E2 proportional to the amplitude of the modulator imbalance. The subtractors 160 and 161 receive respective analog reference signals REF1 and REF2, which are usually identical (REF1=REF2), the output signals of the integrator means 130, 131 being subtracted from REF1 and REF2, respectively. For example, REF1 and REF2 are equal to twice the mean amplitude of the modulated signal S. The subtractors 160 and 161 generally need to be used only for the purposes of correcting imbalance. The signals E1 and E2 are respectively applied to the multipliers 150 and 151 on the input side of the mixers 121 and 120, respectively, to correct the offsets introduced by these mixers.

Although there are already many kinds of compensation circuits and methods, it is still a goal of research to propose newer and better solutions to the I/Q mismatch problem in transmitter systems.

SUMMARY OF THE INVENTION

The object of the present invention is to provide a new method and apparatus of I/Q channel mismatch and local leakage calibration in a transmitter.

The present invention provides a method for I/Q mismatch calibration of a transmitter. First, a discrete-time signal is generated. Next, a corrected signal based on the discrete-time signal and a set of correction parameters $A_p$ and $B_p$ is obtained. Next, the corrected signal is converted to an analog corrected signal. Next, I/Q modulation is applied to the analog corrected signal and outputs a modulated signal. Next, a first desired component measure and a first image component measure with a first set of the correction parameters $A_p$ and $B_p$ are obtained from the modulated signal. Next, a second desired component measure and a second image component measure with a second set of the correction parameters $A_p$ and $B_p$ are obtained from the modulated signal. Next, a third desired component measure and a third image component measure with a third set of the correction parameters $A_p$ and $B_p$ are obtained from the modulated signal. Next, a fourth and fifth set of correction parameters $A_p$ and $B_p$ are obtained based on the first, the second, and the third desired component measures as well as the first, the second, and the third image component measures. Next, a fourth desired component measure and a fourth image component measure with the fourth set of correction parameters $A_p$ and $B_p$ and a fifth desired component measure and a fifth image component measure with the fifth set of correction parameters $A_p$ and $B_p$ are obtained from the modulated signal. Finally, a final set of the correction parameters $A_p$ and $B_p$ are selected from the fourth and fifth sets of correction parameters.

In addition, the method for I/Q mismatch calibration of a transmitter according to the present invention further includes the following steps. A DC compensation parameter $\gamma_p$ is added while obtaining the corrected signal $x_c[n]$ such that $x_c[n]=A_p \cdot (x[n]+\gamma_p)+B_p \cdot (x[n]+\gamma_p)^*$. Next, a first local leakage component measure is obtained from the modulated signal with the final set of parameters $A_p$ and $B_p$, and the first parameter $\gamma_p=\zeta_1$. A second local leakage component measure is then obtained from the modulated signal with the final set of parameters $A_p$ and $B_p$, and the second parameter $\gamma_p=\zeta_2$. Next, a third local leakage component measure is obtained from the modulated signal with the final set of parameters $A_p$ and $B_p$, and the third parameter $\gamma_p=j\zeta_1$. A fourth local leakage component measure is then obtaining from the modulated signal with the final set of parameters $A_p$ and $B_p$, and the fourth parameter $\gamma_p=j\zeta_2$. Next, a fifth local leakage component measure is obtaining from the modulated signal with the final set of parameters $A_p$ and $B_p$, and the fifth parameter $\gamma_p=0$. Finally, a final DC compensation parameter is obtained based on the first local leakage component measure, the second local leakage component measure, the third local leakage component measure, the fourth local leakage component measure and the fifth local leakage component measure.

In addition, the present invention further provides an apparatus for I/Q mismatch calibration of a transmitter. A signal generator generates a discrete-time signal. A correction module receives the discrete-time signal and obtains a corrected signal based on the test signal and a set of correction parameters $A_p$ and $B_p$. A first and second D/A converter converts the corrected signal to an analog signal, wherein the first D/A converter converts the real part of the corrected signal to the real part of the analog signal, and the second D/A converter converts the imaginary part of the corrected signal to the imaginary part of the analog signal. A modulator applies I/Q modulation to the analog signal, and outputs a modulated signal. A measurer implements the steps of obtaining a first desired component measure and a first image component measure from the modulated signal with a first set of the correction parameters $A_p$ and $B_p$, obtaining a second desired component measure and a second image component measure from the modulated signal with a second set of the correction parameters $A_p$ and $B_p$, obtaining a third desired component measure and a third image component measure from the modulated signal with a third set of the correction parameters $A_p$ and $B_p$, obtaining a fourth desired component measure and a fourth image component measure from the modulated signal with a fourth set of correction parameters $A_p$ and $B_p$ and obtaining a fifth desired component measure and a fifth image component measure from the modulated signal with a fifth set of correction parameters $A_p$ and $B_p$. A processor implements the steps of obtaining the fourth and fifth sets of correction parameters $A_p$ and $B_p$ based on the first, the second, and the third desired component measures as well as the first, the second, and the third image component measures, and selecting a final set of correction parameters $A_p$ and $B_p$ from the fourth and fifth sets of correction parameters.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
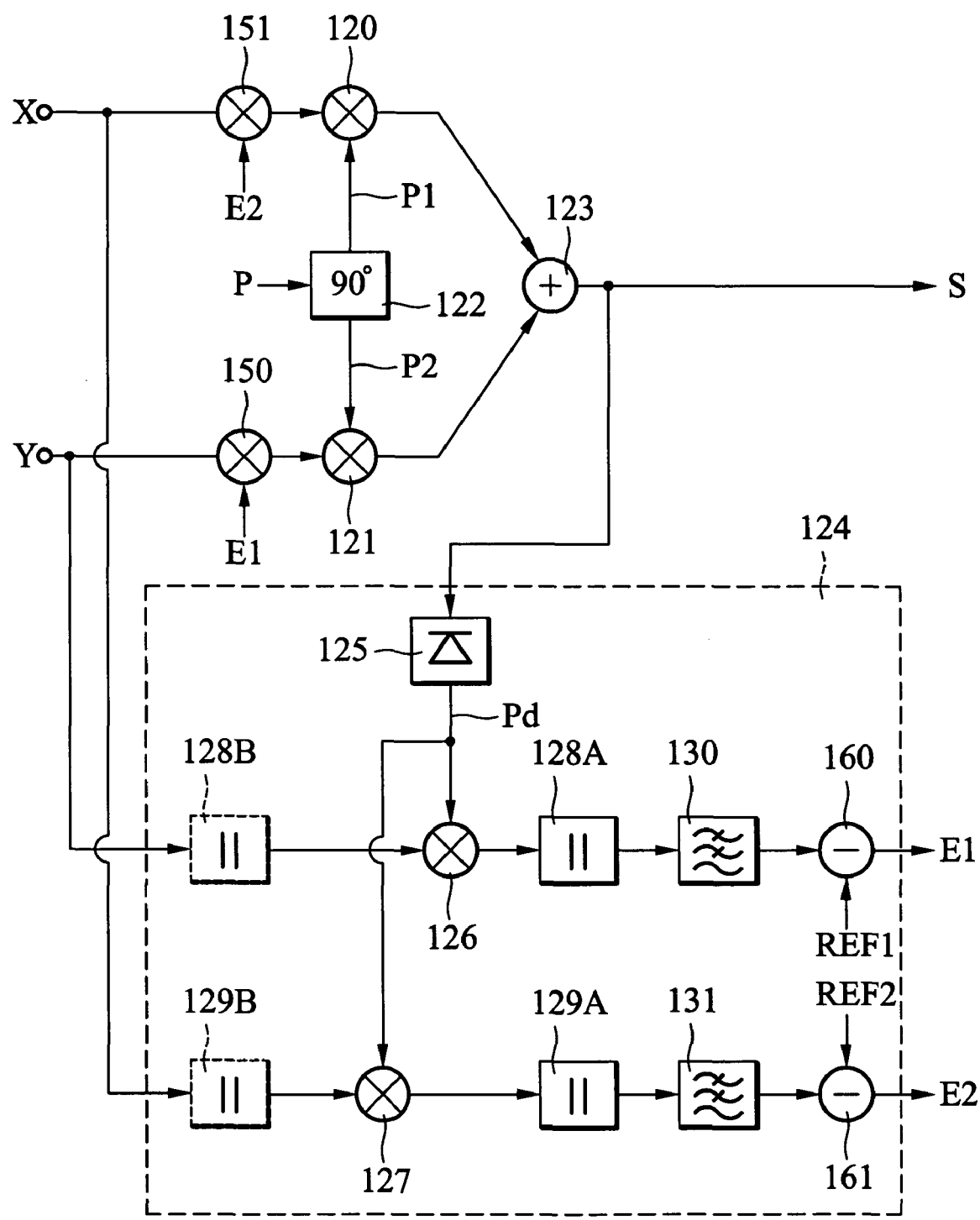
FIG. 1 shows a quadrature modulator controlled by an imbalance estimator as disclosed in U.S. Pat. No. 6,208,698.

In the I/Q channel transmission architecture, there are two major sources of I/Q mismatch. One is the I/Q modulation and the other is the I/Q transmission band filtering. The mismatch resulting from the I/Q modulation is modeled as a constant over the useful signal bandwidth, which is called systematic I/Q mismatch while the I/Q transmission band filtering causes frequency-dependent I/Q mismatch. The present invention concentrates on the systematic I/Q mismatch. The mathematical theories of the invention will be described in the following.

The baseband signals for the I and Q channels before the I/Q modulation are represented as $x_I(t)$ and $x_Q(t)$ respectively. Assuming that an amplitude mismatch $\alpha$, a phase mismatch $\theta$, and zero local leakage results from the I/Q modulation, the equivalent baseband signals $y_I(t)$ and $y_Q(t)$ for the I and Q channels after the I/Q modulation are, without loss of generality, given by the equations:

$$y_I(t)=x_I(t)\cdot(1+\alpha)\cdot\cos(\theta/2)+x_Q(t)\cdot(1-\alpha)\cdot\sin(\theta/2)$$

$$y_Q(t)=x_I(t)\cdot(1+\alpha)\cdot\sin(\theta/2)+x_Q(t)\cdot(1-\alpha)\cdot\cos(\theta/2) \quad (7)$$

The combined baseband signal $x(t)$ before the I/Q modulation can be expressed as $x_I(t)+jx_Q(t)$ while the combined equivalent baseband signal $y(t)$ after the I/Q modulation can be expressed as $y_I(t)+jy_Q(t)$. Thus, from the equation (7), the I/Q mismatch model can be expressed by the following equation:

$$y(t)=A\cdot x(t)+B\cdot x^*(t) \quad (8)$$

where A and B are complex numbers with $$A = \frac{1}{2}\{(1+\alpha)e^{j\theta/2} + (1-\alpha)e^{-j\theta/2}\} \quad (9)$$

$$B = \frac{1}{2}\{(1+\alpha)e^{j\theta/2} - (1-\alpha)e^{-j\theta/2}\}$$

Eq. (8) is for the case of zero local leakage. When the local leakage $\gamma$ is further considered, the I/Q mismatch model becomes $$y(t)=A\cdot x(t)+B\cdot x^*(t)+\gamma \quad (10)$$

One of solutions to the I/Q mismatch compensation is pre-distortion of the baseband signal $x(t)$ before the I/Q modulation. If the signal is pre-distorted properly, the signal after the I/Q modulation will be free from the I/Q mismatch since the I/Q mismatch and the pre-distortion cancel out. Assuming that the baseband signal $x(t)$ is pre-distorted by a function D, the pre-distorted signal $z(t)$ is expressed as $D(x(t))$. The ideally calibrated output signal should be:

$$y(t) = A \cdot D(x(t)) + B \cdot (D(x(t)))^* + \gamma \quad (11)$$

$$= C \cdot x(t) \quad (12)$$

where C is a constant.

Accordingly, the I/Q mismatch compensation can be achieved by identifying the function D to satisfy the equation (12). One of solutions for the function D is a function with parameters $A_p$ and $B_p$ and is given by:

$$D(x(t))=A_p\cdot x(t)+B_p\cdot x^*(t) \quad (13)$$

As will be shown, Eq. (13) will be implemented via digital signal process. The above is for the case of zero compensation of local leakage. When considering the compensation of the local leakage of the IQ modulation, the function D becomes $$D(x(t))=A_p\cdot(x(t)+\gamma_p)+B_p\cdot(x(t)+\gamma_p)^* \quad (14)$$

By substituting the equation (14) into the equation (11), we derive:

$$y(t) = (A \cdot A_p + B \cdot B_p^*)\cdot x(t) + (A \cdot B_p + B \cdot A_p^*)\cdot x^*(t) + \quad (15)$$
$$(A \cdot A_p + B \cdot B_p^*)\cdot \gamma_p + (A \cdot B_p + B \cdot A_p^*)\cdot \gamma_p^* + \gamma$$

The equation (12) is satisfied if $$\begin{cases}(A\cdot B_p + B\cdot A_p^*) = 0 \\ \gamma_p = -\gamma\end{cases} \quad (16)$$

Therefore, the goal of the calibration method in the invention is to identify the coefficients $A_p$, $B_p$, and $\gamma_p$ in the equation (16).

Figure 2:
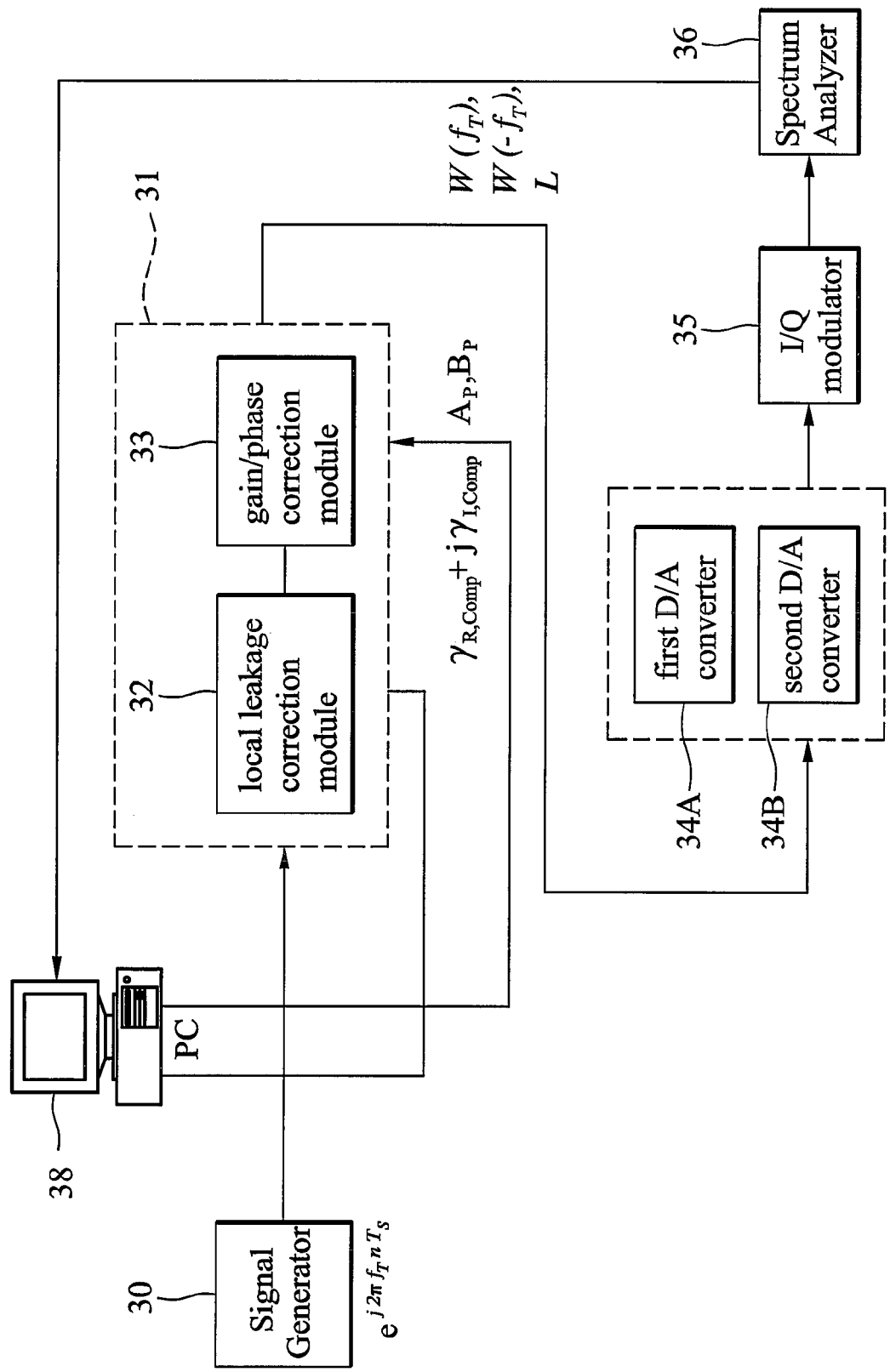
FIG. 2 shows a setup of TX I/Q mismatch and carrier local leakage calibration for 802.11g of a transmitter.

FIG. 2 shows a setup of TX I/Q channel mismatch and carrier local leakage calibration for 802.11 g of a transmitter according to the embodiment of the present invention. First, a discrete-time signal $x[n]=x(nT_s)=e^{j2\pi f_T nT_s}$ is generated by a signal generator 30, where $x(t)=e^{j2\pi f_T t}$ represents a single tone signal, $f_T$ is a real number representing the frequency in Hz of the signal $x(t)$ and $T_S$ is the sampling period. Next, the signal $x[n]$ is passed to an I/Q correction module 31 including local leakage correction module 32 and gain/phase correction module 33, then the corrected signal $x_c[n]$ output by the I/Q correction module 31 is fed to a pair of D/A converters, the first D/A converter 34A and the second D/A converter 34B, which convert the corrected signal $x_c[n]$ to an analog signal $x_c(t)$. To speak more specifically, the first D/A converter 34A converts the real part of the corrected signal $x_c[n]$ to the real part of the analog signal $x_c(t)$ and the second D/A converter 34B converts the imaginary part of the corrected signal $x_c[n]$ to the imaginary part of the analog signal $x_c(t)$. The analog signal $x_c(t)$ is applied to an I/Q modulator, which increase the central frequency of the analog signal $x_c(t)$ by $f_c$ Hz and outputting a modulated signal $x_m(t)$, wherein $f_c$ is a preset real number. The modulated signal $x_m(t)$ is then monitored by a spectrum analyzer 36, or other equipment that can monitor the signal spectrum, to obtain the intensities of the frequency components of the modulated signal $x_m(t)$ at $f_c+f_T$, $f_c-f_T$, and $f_c$ Hz, denoted by $W(f_T)$, $W(-f_T)$, and L, respectively. The $W(f_T)$, $W(-f_T)$, and L are actually values indicative of the power of the equivalent baseband signal of $x_m(t)$ at $f_T$, $-f_T$, and 0 Hz, respectively. From the point of view of the I/Q correction, the term $W(f_T)$ represents a desired component, which will contain all the energy of the analog corrected signal $x_c(t)$ if the I/Q mismatch is ideally compensated. And the term $W(-f_T)$ represents the image component, which is the additional interfering component at the image frequency due to the I/Q imbalance. And the term L represents the local leakage component, which is the baseband-equivalent DC component incurred by the carrier leakage. According to the obtained data $W(f_T)$, $W(-f_T)$, and L, the personal computer (PC) 38 computes the parameters required by the I/Q correction module 31 to minimize the impacts due to the I/Q channel mismatch and local leakage.

Figure 3A:
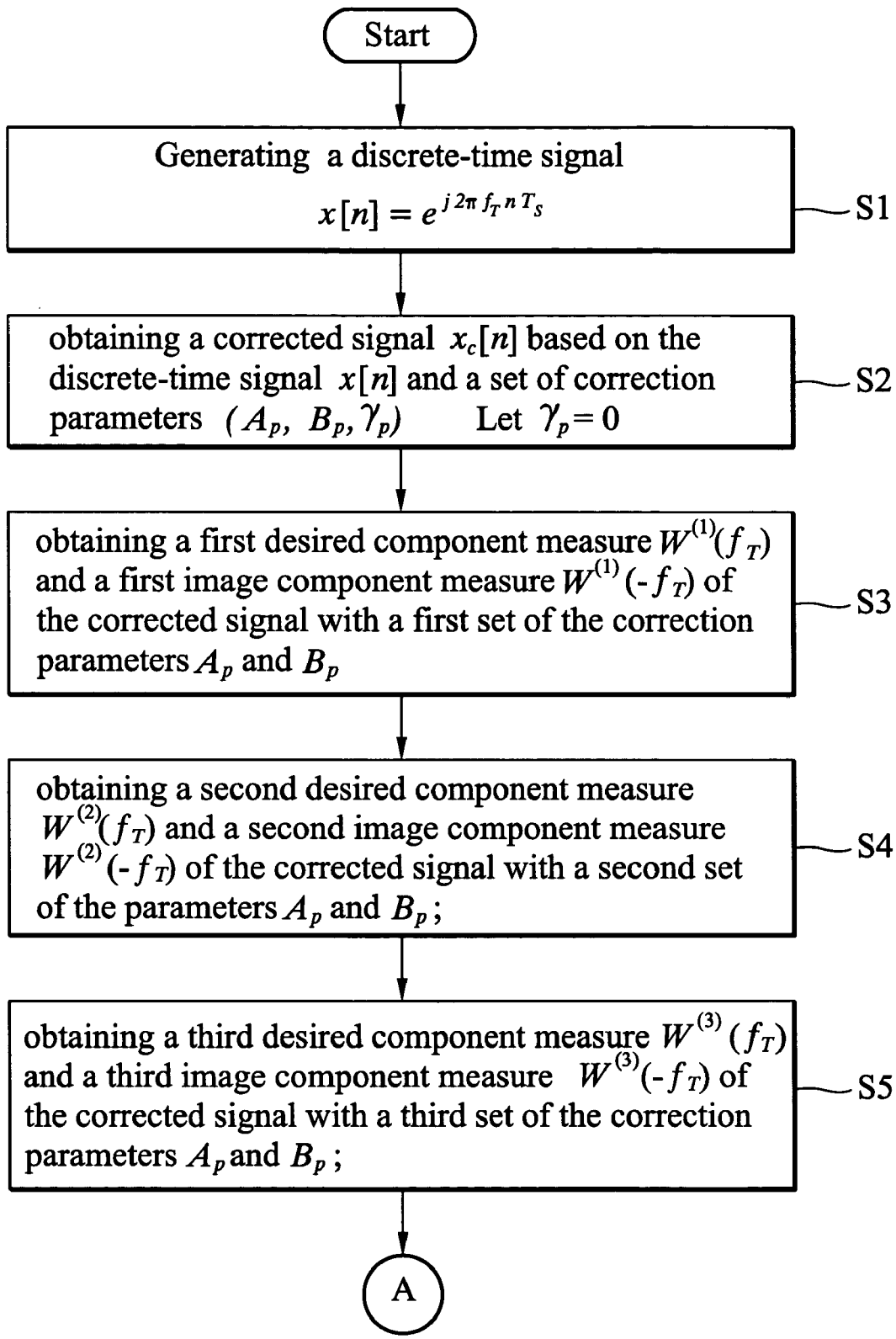
FIGS. 3A-3C are flowcharts of a method for I/Q mismatch and local leakage calibration of a receiver according to one embodiment of the invention.
Figure 3B:
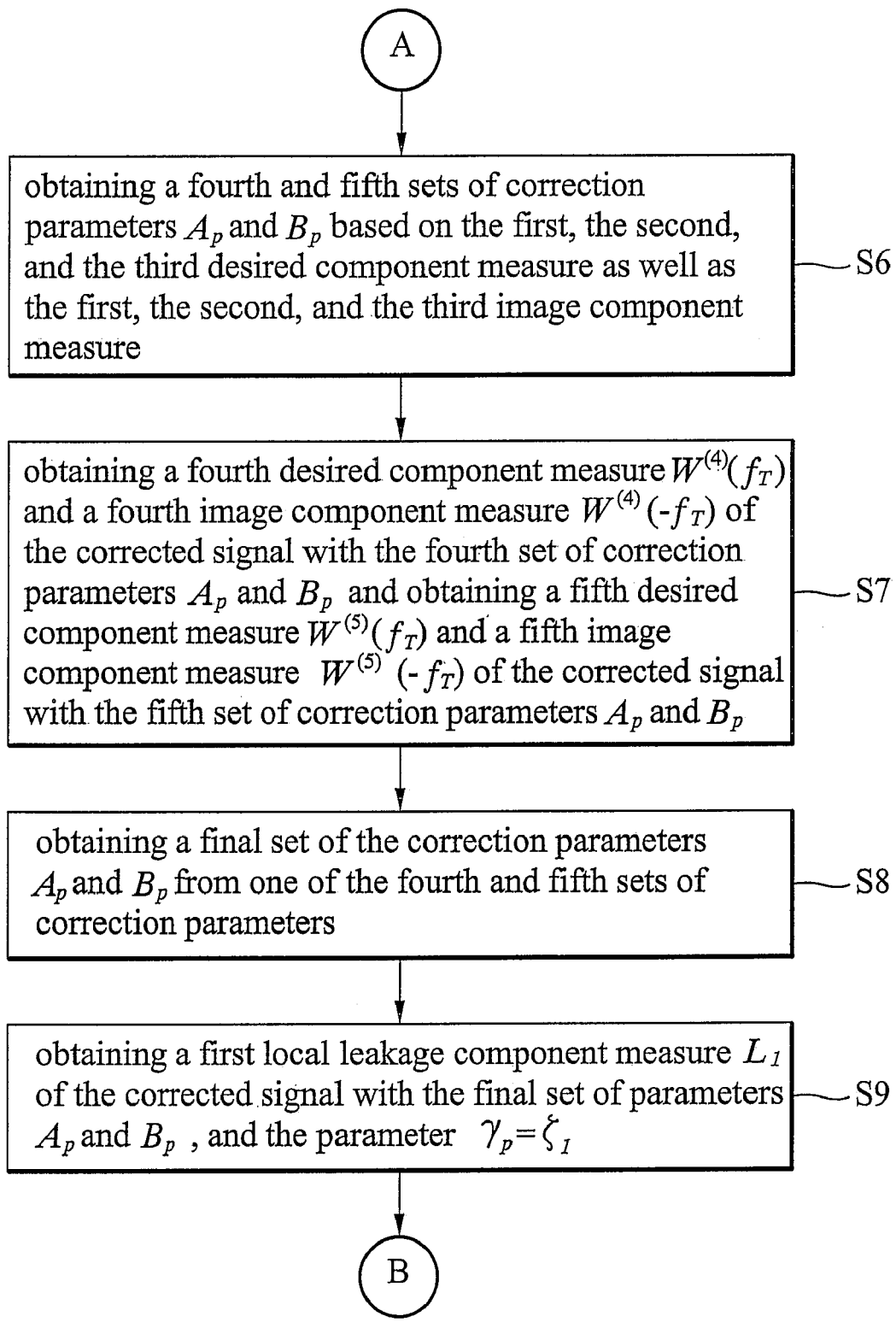
Figure 3C:
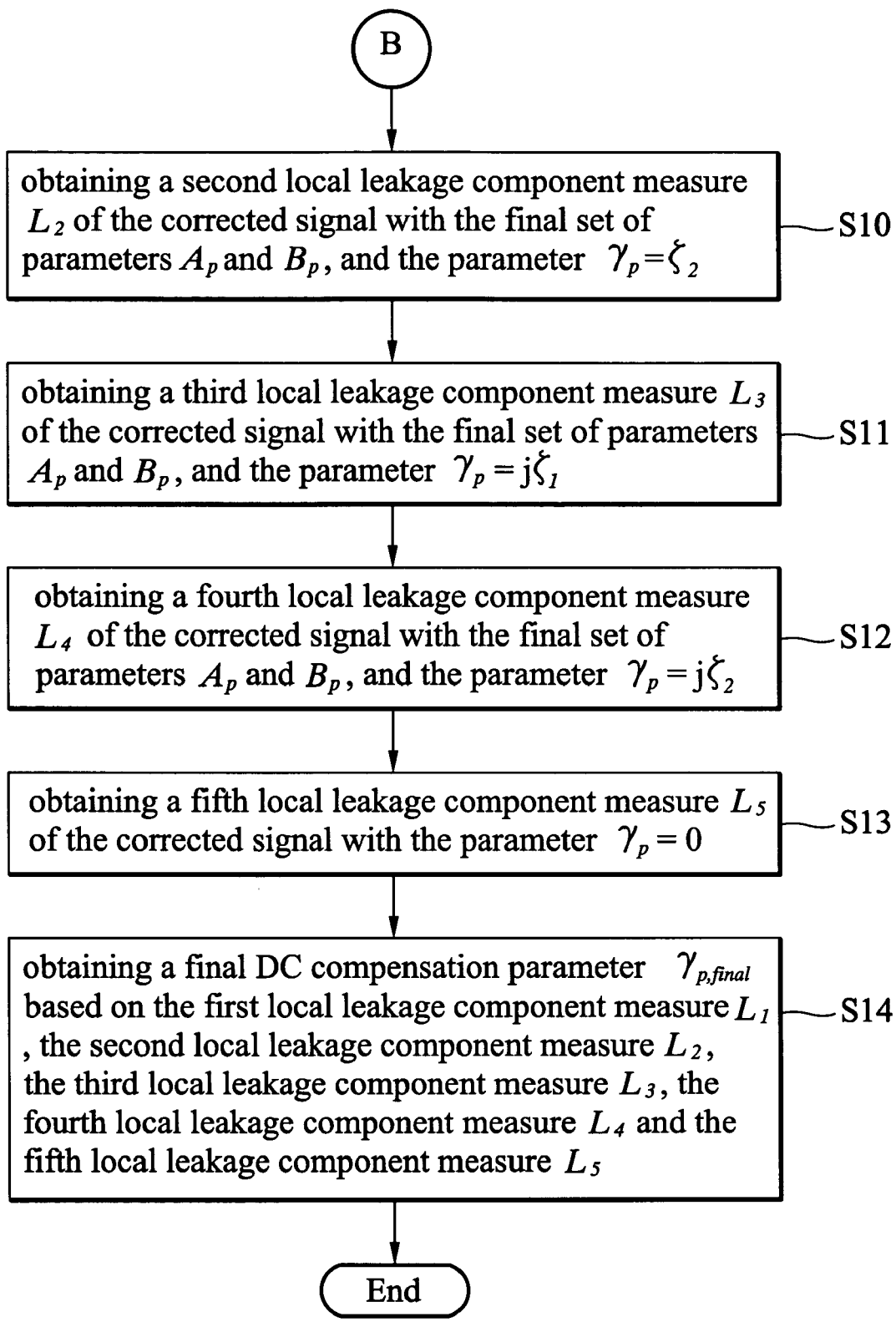

FIGS. 3A-3C are flowcharts of a method for I/Q channel mismatch and local leakage calibration of a transmitter according to one embodiment of the invention.

First, a discrete-time signal $x[n]=x(nT_s)=e^{j2\pi f_T nT_s}$ is generated by the signal generator 30 (S1), wherein $x(t)=e^{j2\pi f_T t}$ represents a single tone signal, $f_T$ is a real number representing the frequency of the signal x(t) and $T_s$ is the sampling period. Next, in the present invention, the I/Q gain and phase errors are first calibrated. After the I/Q gain and phase errors are corrected, the local leakage calibration procedure is then performed.

Let $x[n]=x_R[n]+jx_I[n]$ be the input signal of the I/Q correction module 31, which outputs a corrected signal $x_c[n]$ based on the discrete-time signal $x[n]$ and a set of correction parameters $(A_p, B_p, \gamma_p)$ (S2). To speak more specifically, the output of the I/Q correction module 31 is expressed by $x_c[n]=A_p\cdot(x[n]+\gamma_P)+B_P\cdot(x[n]+\gamma_P)^*$ First, the corrected signal $x_c[n]$ output by the I/Q correction module 31 is fed to a pair of D/A converters 34, which then convert the corrected signal $x_c[n]$ to an analog signal $x_c(t)$. To speak more specifically, the first D/A converter converts the real part of the corrected signal $x_c[n]$ to the real part of the analog signal $x_c(t)$ and the second D/A converter converts the imaginary part of the corrected signal $x_c[n]$ to the imaginary part of the analog signal $x_c(t)$. The analog signal $x_c(t)$ is then applied to an I/Q modulator, which increases the central frequency of the analog signal $x_c(t)$ by $f_c$ Hz and outputs a modulated signal $x_m(t)$, wherein $f_c$ is a preset real number. The modulated signal $x_m(t)$ is then analyzed by the spectrum analyzer 36. In the present invention, a plurality of sets of parameters $A_p$, $B_p$ and $\gamma_p$ are predetermined, and then the spectrum analyzer 36 analyzes the modulated signal $x_m(t)$ with different sets of the parameters $A_p$, $B_p$ and $\gamma_p$.

In the I/Q mismatch calibration procedure (S3~S8) according to the embodiment of the present invention, the parameter $\gamma_p$ is zero during the procedure. A first desired component measure $W^{(1)}(f_T)$ and a first image component measure $W^{(1)}(-f_T)$ is obtained with a first set of the correction parameters $A_p$ and $B_p$ (S3). The first set of the correction parameters $A_p$ and $B_p$ is $(A_p, B_p)=(a, 0)$, wherein a is a real number.

When a=1, we have $x_c(t)=x(t)$. The equivalent baseband signal of the modulated signal, denoted by y(t), is given by:

$$y(t) = A \cdot x[n] + B \cdot x^*[n] + \gamma \quad (17)$$

$$= A \cdot e^{j2\pi f_T t} + B \cdot e^{-j2\pi f_T t} + \gamma$$

thus, the intensities of the resulting desired tone component $W^{(1)}(f_T)$, the image component $W^{(1)}(-f_T)$ associated with the first set of the correction parameters $A_p$ and $B_p$ are obtained from the spectrum analyzer 36, see the equation (18).

$$W^{(1)}(f_T) = \beta_1 |A|^2 \quad (18)$$

$$= \beta_1 \left|\cos\frac{\theta}{2} + j\alpha\sin\frac{\theta}{2}\right|^2$$

$$= \beta_1 \left(\cos^2\frac{\theta}{2} + \alpha^2\sin^2\frac{\theta}{2}\right)$$

$$W^{(1)}(-f_T) = \beta_1 |B|^2$$

$$= \beta_1 \left|\alpha\cos\frac{\theta}{2} + j\sin\frac{\theta}{2}\right|^2$$

$$= \beta_1 \left(\alpha^2\cos^2\frac{\theta}{2} + \sin^2\frac{\theta}{2}\right)$$

where $\beta_1$ is an unknown constant related to the spectrum analyzer 36. Here, the measures $W^{(1)}(f_T)$ and $W^{(1)}(-f_T)$ are values indicative of the power of the signal y(t) at $f_T$ and $-f_T$ Hz, respectively.

In this case, the image-rejection ratio $\rho^{(1)}$ is $$\rho^{(1)} = \frac{W^{(1)}(-f_T)}{W^{(1)}(f_T)} = \frac{\alpha^2\cos^2\frac{\theta}{2} + \sin^2\frac{\theta}{2}}{\cos^2\frac{\theta}{2} + \alpha^2\sin^2\frac{\theta}{2}} \quad (19)$$

Next, a second desired component measure $W^{(2)}(f_T)$ and a second image component measure $W^{(2)}(-f_T)$ are obtained from the spectrum analyzer 36 with a second set of the correction parameters $A_p$ and $B_p$ (S4). The second set of the correction parameters $A_p$ and $B_p$ is $(A_p, B_p)=(b, b)$, wherein 'b' is a real number.

When $b = \frac{1}{2}$:

$$y(t) = A \cdot (0.5 \cdot x(t) + 0.5 \cdot x^*(t)) + B \cdot (0.5 \cdot x(t) + 0.5 \cdot x^*(t))^* + \gamma \quad (20)$$

$$= (0.5A + 0.5B) \cdot x(t) + (0.5A + 0.5B) \cdot x^*(t) + \gamma$$

$$= (0.5A + 0.5B) \cdot e^{j2\pi f_T t} + (0.5A + 0.5B) \cdot e^{-j2\pi f_T t} + \gamma$$

Thus, the intensities of the resulting desired tone component $W^{(2)}(f_T)$, the image component $W^{(2)}(-f_T)$ are obtained from the spectrum analyzer 36 with the second set of the correction parameters $A_p$ and $B_p$, see the equation (21).

$$W^{(2)}(f_T) = \beta_2 |0.5A + 0.5B|^2 \quad (21)$$

$$= \frac{\beta_2}{4}\left|\cos\frac{\theta}{2} + j\alpha\sin\frac{\theta}{2} + \alpha\cos\frac{\theta}{2} + j\sin\frac{\theta}{2}\right|^2$$

$$= \frac{\beta_2}{4}\left|(1+\alpha)\cos\frac{\theta}{2} + j(1+\alpha)\sin\frac{\theta}{2}\right|^2$$

$$= \frac{\beta_2}{4}\left((1+\alpha)^2\cos^2\frac{\theta}{2} + (1+\alpha)^2\sin^2\frac{\theta}{2}\right)$$

$$= \frac{\beta_2(1+\alpha)^2}{4}$$

$$W^{(2)}(-f_T) = \beta_2 |0.5A + 0.5B|^2 = \frac{\beta_2(1+\alpha)^2}{4}$$

Here, from the output of the spectrum analyzer 36, a value $N = W^{(2)}(-f_T) = W^{(2)}(f_T)$ is proportional to $(1+\alpha)^2$.

Next, a third desired component measure $W^{(3)}(f_T)$ and a third image component measure $W^{(3)}(-f_T)$ are obtained from the spectrum analyzer 36 with a third set of the correction parameters $A_p$ and $B_p$ (S5). The third set of the correction parameters $A_p$ and $B_p$ is $(A_p, B_p)=(b, -b)$.

When $b = \frac{1}{2}$:

$$y(t) = A(0.5 \cdot x(t) - 0.5 \cdot x^*(t)) + B(0.5 \cdot x(t) - 0.5 \cdot x^*(t))^* + \gamma \quad (22)$$

$$= (0.5A - 0.5B) \cdot x(t) + (-0.5A + 0.5B) \cdot x^*(t) + \gamma$$

$$= (0.5A - 0.5B) \cdot e^{j2\pi f_T t} + (-0.5A + 0.5B) \cdot e^{-j2\pi f_T t} + \gamma$$

Thus, the intensities of the resulting desired tone component $W^{(3)}(f_T)$, the image component $W^{(3)}(-f_T)$ are obtained from the spectrum analyzer 36 with the third set of the correction parameters $A_p$ and $B_p$, see the equation (23).

$$W^{(3)}(f_T) = \beta_2 |0.5A - 0.5B|^2 \quad (23)$$

$$= \frac{\beta_2}{4}\left|\cos\frac{\theta}{2} + j\alpha\sin\frac{\theta}{2} - \alpha\cos\frac{\theta}{2} - j\sin\frac{\theta}{2}\right|^2$$

$$= \frac{\beta_2}{4}\left|(1-\alpha)\cos\frac{\theta}{2} + j(\alpha-1)\sin\frac{\theta}{2}\right|^2$$

$$= \frac{\beta_2}{4}\left((1-\alpha)^2\cos^2\frac{\theta}{2} + (1-\alpha)^2\sin^2\frac{\theta}{2}\right)$$

$$= \frac{\beta_2(1-\alpha)^2}{4}$$

$$W^{(3)}(-f_T) = \beta_2|-0.5A + 0.5B|^2 = \frac{\beta_2(1-\alpha)^2}{4}$$

where $\beta_2$ is an unknown constant related to the spectrum analyzer 36. Here, from the output of the spectrum analyzer 36, a value $O = W^{(3)}(-f_T) = W^{(3)}(f_T)$ is proportional to $(1-\alpha)^2$. Thus, the gain mismatch term $\alpha$ can be estimated by $$\alpha \approx \hat{\alpha} = \frac{\sqrt{\frac{N}{O}} - 1}{\sqrt{\frac{N}{O}} + 1} \quad (24)$$

Term N can be set to be either $N = W^{(2)}(f_T)$ or $N = W^{(2)}(-f_T)$. Due to the existence of the measurement error, the term N can also set to be $N = (W^{(2)}(f_T) + W^{(2)}(-f_T))/2$ or $N = \sqrt{W^{(2)}(f_T) \cdot W^{(2)}(-f_T)}$ to increase the accuracy. Similarly, Term O can be set to be either $O = W^{(3)}(f_T)$ or $O = W^{(3)}(-f_T)$. Due to the existence of the measurement error, the term O can also set to be $O = (W^{(3)}(f_T) + W^{(3)}(-f_T))/2$ or $O = \sqrt{W^{(3)}(f_T) \cdot W^{(3)}(-f_T)}$ to increase the accuracy. Substitute $\alpha$ into the equation (19), the values Q and P are obtained, see the equation (25).

$$Q = \frac{\hat{\alpha}^2 - \rho^{(1)}}{(1+\rho^{(1)})(\hat{\alpha}^2 - 1)} = \sin^2\frac{\theta}{2} \quad (25)$$

$$P = 1 - Q = 1 - \sin^2\frac{\theta}{2} = \cos^2\frac{\theta}{2} \quad (26)$$

Next, a fourth and fifth set of correction parameters $A_p$ and $B_p$ are obtained based on the first desired component measure $W^{(1)}(f_T)$, the second desired component measure $W^{(2)}(f_T)$, and the third desired component measure $W^{(3)}(f_T)$, and the first image component measure $W^{(1)}(-f_T)$, the second image component measure $W^{(2)}(-f_T)$, and the third image component measure $W^{(3)}(-f_T)$ (S6).

The fourth and fifth sets of correction parameters $A_p$ and $B_p$ are expressed by parameters $\hat{\alpha}$, P, and Q. The fourth set of the correction parameters $A_p$ and $B_p$ is $$A_p = \sqrt{P} - j\hat{\alpha}\sqrt{Q}$$

$$B_p = -\hat{\alpha}\sqrt{P} - j\sqrt{Q},$$

and the fifth set of the correction parameters $A_p$ and $B_p$ is $$A_p = \sqrt{P} + j\hat{\alpha}\sqrt{Q}$$

$$B_p = -\hat{\alpha}\sqrt{P} + j\sqrt{Q},$$

Next, a fourth desired component measure $W^{(4)}(f_T)$ and a fourth image component measure $W^{(4)}(-f_T)$ are obtained with the fourth set of correction parameters $A_p$ and $B_p$, and a fifth desired component measure $W^{(5)}(f_T)$ and a fifth image component measure $W^{(5)}(-f_T)$ are obtained with the fifth set of correction parameters $A_p$ and $B_p$ (S7).

Last, a final set of the correction parameters $A_p$ and $B_p$ is determined according to the fourth and fifth sets of correction parameters (S8). In addition, since there is no information about the sign of the phase mismatch $\theta$, a hypothesis testing is performed to determine whether $$\sin\frac{\theta}{2} = \sqrt{Q} \text{ or } \sin\frac{\theta}{2} = -\sqrt{Q},$$

however, in either case, $$\cos\frac{\theta}{2} = \sqrt{1-Q}$$

since $$-\frac{\pi}{2} < \theta < \frac{\pi}{2}$$

in typical conditions.

If the image rejection ratio corresponding to the fourth set of ($A_p$, $B_p$) is less than or equal to the image rejection ratio corresponding to the fifth set of ($A_p$, $B_p$), the fourth set of ($A_p$, $B_p$) is chosen as the final set of ($A_p$, $B_p$), otherwise, the fifth set of ($A_p$, $B_p$) is chosen as the final set of ($A_p$, $B_p$). In addition, the final set of ($A_p$, $B_p$) can be further multiplied by a normalization factor $$\chi = \frac{1}{AA_p + BB_p^*} = \frac{1}{(1-\hat{\alpha}^2)\cdot(1-2Q)}$$

to ensure the unity gain of the correction process.

The steps S6 and S8 are performed by the personal computer 38 shown in FIG. 2 of the present invention.

In addition, it is not the only way to determine the final set of the correction parameters $A_p$ and $B_p$ through the value of $$\frac{W^{(4)}(-f_T)}{W^{(4)}(f_T)} \text{ and } \frac{W^{(5)}(-f_T)}{W^{(5)}(f_T)}.$$

Under the final parameter, the image component would be very small (theoretically it is zero), and therefore would be much less than the image component under the other sets of parameter. From another angle, a small image component will imply a strong desired component, since their sum should be the same in split regardless of the set of parameters. Therefore, under the final parameter, the desired component would be stronger than the desired component under the other set of parameters.

Next, the local leakage calibration is active after the elimination of I/Q channel mismatch errors in step S9~S13.

In the local leakage calibration procedure according to the embodiment of the present invention, a first local leakage component measure $L_1$ of the corrected signal is obtained from the spectrum analyzer 36 with the final set of parameters $A_p$ and $B_p$, and the parameter $\gamma_p = \zeta_1$ (S9), where $\zeta_1$ is a real number.

Thus, the carrier leakage term at the spectrum analyzer 36 is $$L_1 = \beta_3 \cdot (\gamma_R^2 + \gamma_I^2 + \zeta_1^2 + 2\gamma_R \cdot \zeta_1). \tag{27}$$

where $\beta_3$ is a scaling factor.

Next, a second local leakage component measure $L_2$ of the corrected signal is obtained from the spectrum analyzer 36 with the final set of parameters $A_p$ and $B_p$, and the parameter $\gamma_p = \zeta_2$ (S10), where $\zeta_2$ is a real number.

Thus, the carrier leakage term at the spectrum analyzer 36 is $$L_2 = \beta_3 \cdot (\gamma_R^2 + \gamma_I^2 + \zeta_2^2 + 2\gamma_R \cdot \zeta_2). \tag{28}$$

Next, a third local leakage component measure $L_3$ of the corrected signal is obtained from the spectrum analyzer 36 with the final set of parameters $A_p$ and $B_p$, and the parameter $\gamma_p = j\zeta_1$ (S11), where $\zeta_1$ is a real number.

Thus, the carrier leakage term at the spectrum analyzer 36 is $$L_3 = \beta_3 \cdot (\gamma_R^2 + \gamma_I^2 + \zeta_1^2 + 2\gamma_I \cdot \zeta_1). \tag{29}$$

Next, a fourth local leakage component measure $L_4$ of the corrected signal is obtained from the spectrum analyzer 36 with the final set of parameters $A_p$ and $B_p$, and the parameter $\gamma_p = j\zeta_2$ (S12), where $\zeta_2$ is another real number.

Thus, the carrier leakage term at the spectrum analyzer 36 is $$L_4 = \beta_3 \cdot (\gamma_R^2 + \gamma_I^2 + \zeta_2^2 + 2\gamma_I \cdot \zeta_2). \tag{30}$$

Next, a fifth local leakage component measure $L_5$ of the corrected signal is obtained from the spectrum analyzer 36 with the final set of parameters $A_p$ and $B_p$, and the parameter $\gamma_p = 0$ (S13).

Thus, the carrier leakage term at the spectrum analyzer 36 is $$L_5 = \beta_3 \cdot (\gamma_R^2 + \gamma_I^2). \tag{31}$$

Thus, the parameters $\gamma_R$ and $\gamma_I$ are obtained based on the first local leakage component measure $L_1$, the second local leakage component measure $L_2$, the third local leakage component measure $L_3$, the fourth local leakage component measure $L_4$ and the fifth local leakage component measure $L_5$ (S14), see the equations (32) and (33).

$$\hat{\gamma}_R = \frac{1}{2} \frac{\zeta_2^2 (L_1 - L_5) - \zeta_1^2 (L_2 - L_5)}{\zeta_1 (L_2 - L_5) - \zeta_2 (L_1 - L_5)} \tag{32}$$

$$\hat{\gamma}_I = -\frac{1}{2} \frac{\zeta_2^2 (L_3 - L_5) - \zeta_1^2 (L_4 - L_5)}{\zeta_1 (L_4 - L_5) - \zeta_2 (L_3 - L_5)} \tag{33}$$

Finally, according to the step S14, the final DC compensation parameter $\gamma_{p,final}$ is obtained by $$\gamma_{p,final} = -\frac{1}{2} \cdot \frac{\zeta_2^2 (L_1 - L_5) - \zeta_1^2 (L_2 - L_5)}{\zeta_1 (L_2 - L_5) - \zeta_2 (L_1 - L_5)} - j\frac{1}{2} \cdot \frac{\zeta_2^2 (L_3 - L_5) - \zeta_1^2 (L_4 - L_5)}{\zeta_1 (L_4 - L_5) - \zeta_2 (L_3 - L_5)} \tag{34}$$

In addition, the step S14 is performed by the personal computer 38 shown in FIG. 2 of the present invention.

The previously described method can be applied to a transceiver module, e.g., an IEEE 802.11 compliant wireless LAN transceiver module, involving I/Q demodulation. Wireless LANs based on the IEEE 802.11 standard have achieved wide customer acceptance in the enterprise environment. They are expected to continue to expand in popularity and become ubiquitous communication systems even in private and public places.

Thus, after the calibration procedure, the I/Q correction module compensates the I/Q channel mismatch in the signal from the baseband transmitter by the finally determined coefficients $A_p$, $B_p$ and $\gamma_p$. The previously described calibration procedure may be implemented upon production stage of the transceiver.

In conclusion, the present invention provides a new method and apparatus for transmitter I/Q mismatch calibration, especially suitable for an IEEE 802.11g compliant WLAN transceiver module. The compensation of the I/Q mismatch is achieved by a signal pre-distortion prior to the I/Q modulation. The coefficients of the pre-distortion function are determined by a calibration procedure. After performing the procedure disclosed by the embodiment of the present invention, the coefficients are accurate enough for the transmitted signal to be free from the I/Q mismatch.

In addition, the present invention can be applied to any kind of transmitter having an I/Q modulator, and the OFDM transmitter is just one example, thus it is not limited to the scope of the present invention.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for in-phase and quadrature mismatch calibration of a transmitter, comprising the following steps:

generating a discrete-time signal $x[n] = x(n \cdot T_s)$, wherein $x(t) = e^{j2\pi f_T t}$ and $f_T$ and $T_s$ are real numbers;

obtaining a corrected signal $x_c[n]$ based on the signal $x[n]$ and a set of correction parameters $A_p$ and $B_p$, wherein $$x_c[n] = A_p \cdot x[n] + B_p \cdot x^*[n];$$

converting the corrected signal $x_c[n]$ to an analog corrected signal $x_c(t)$;

applying in-phase and quadrature modulation to the analog corrected signal $x_c(t)$ and outputting a modulated signal $x_m(t)$;

obtaining a first desired component measure $W^{(1)}(f_T)$ and a first image component measure $W^{(1)}(-f_T)$ from the modulated signal $x_m(t)$ with a first set of the correction parameters $A_p$ and $B_p$;

obtaining a second desired component measure $W^{(2)}(f_T)$ and a second image component measure $W^{(2)}(-f_T)$ from the modulated signal $x_m(t)$ with a second set of the correction parameters $A_p$ and $B_p$;

obtaining a third desired component measure $W^{(3)}(f_T)$ and a third image component measure $W^{(3)}(-f_T)$ from the modulated signal $x_m(t)$ with a third set of the correction parameters $A_p$ and $B_p$;

obtaining a fourth and fifth set of correction parameters $A_p$ and $B_p$ based on the first, the second, and the third desired component measures as well as the first, the second, and the third image component measures;

obtaining a fourth desired component measure $W^{(4)}(f_T)$ and a fourth image component measure $W^{(4)}(-f_T)$ from the modulated signal $x_m(t)$ with the fourth set of correction parameters $A_p$ and $B_p$;

obtaining a fifth desired component measure $W^{(5)}(f_T)$ and a fifth image component measure $W^{(5)}(-f_T)$ from the modulated signal $x_m(t)$ with the fifth set of correction parameters $A_p$ and $B_p$; and obtaining a final set of the correction parameters $A_p$ and $B_p$ from the fourth and fifth sets of correction parameters.

2. The method for in-phase and quadrature mismatch calibration of a transmitter as claimed in claim 1, wherein the first set of correction parameters $(A_p, B_p)=(a,0)$, the second set of correction parameters $(A_p,B_p)=(b,b)$, and the third set of correction parameters $(A_p,B_p)=(b,-b)$, where a and b are real numbers.

3. The method for in-phase and quadrature mismatch calibration of a transmitter as claimed in claim 2, wherein the parameter a is 1 and the parameter b is ½.

4. The method for mismatch calibration of a transmitter as claimed in claim 1, wherein the fourth set of correction parameters $(A_p,B_p)$ are obtained by $A_p=\sqrt{P}-j\hat{\alpha}\sqrt{Q}$ $B_p=-\hat{\alpha}\sqrt{P}-j\sqrt{Q}$ and the fifth set of correction parameters $(A_p,B_p)$ are obtained by $A_p=\sqrt{P}+j\hat{\alpha}\sqrt{Q}$ $B_p=-\hat{\alpha}\sqrt{P}+j\sqrt{Q}$ where $$\alpha \approx \hat{\alpha} = \frac{\sqrt{\frac{N}{O}}-1}{\sqrt{\frac{N}{O}}+1},$$

$N = (W^{(2)}(f_T) + W^{(2)}(-f_T))/2,$ $O = (W^{(3)}(f_T) + W^{(3)}(-f_T))/2,$ $Q = \frac{\hat{\alpha}^2 - \rho^{(1)}}{(1+\rho^{(1)})(\hat{\alpha}^2 - 1)},$ $P = 1 - Q,$ $\rho^{(1)} = \frac{W^{(1)}(-f_T)}{W^{(1)}(f_T)}.$ 5. The method for in-phase and quadrature mismatch calibration of a transmitter as claimed in claim 1, wherein the final set of correction parameters $(A_p,B_p)$ is set to be the fourth set of correction parameters if a function of $W^{(4)}(-f_T)$ is less than the function of $W^{(5)}(-f_T)$, otherwise the final set of correction parameters $(A_p,B_p)$ is set to be the fifth set of correction parameters.

6. The method for in-phase and quadrature mismatch calibration of a transmitter as claimed in claim 5, wherein the final set of correction parameters $(A_p,B_p)$ is set to be the fourth set of correction parameters if a value of $W^{(4)}(-f_T)$ is less than a value of $W^{(5)}(-f_T)$, otherwise the final set of correction parameters $(A_p,B_p)$ is set to be the fifth set of correction parameters.

7. The method for in-phase and quadrature mismatch calibration of a transmitter as claimed in claim 1, wherein the final set of correction parameters $(A_p,B_p)$ is set to be the fourth set of correction parameters if a function of $W^{(4)}(f_T)$ is greater than the function of $W^{(5)}(f_T)$, otherwise the final set of correction parameters $(A_p,B_p)$ is set to be the fifth set of correction parameters.

8. The method for in-phase and quadrature mismatch calibration of a transmitter as claimed in claim 7, wherein the final set of correction parameters $(A_p,B_p)$ is set to be the fourth set of correction parameters if a value of $W^{(4)}(f_T)$ is greater than $W^{(5)}(f_T)$, otherwise the final set of correction parameters $(A_p,B_p)$ is set to be the fifth set of correction parameters.

9. The method for in-phase and quadrature mismatch calibration of a transmitter as claimed in claim 1, wherein the final set of correction parameters $(A_p,B_p)$ is set to be the fourth set of correction parameters if a function of $W^{(4)}(-f_T)$ and $W^{(4)}(f_T)$ is less than the function of $W^{(5)}(-f_T)$ and $W^{(5)}(f_T)$, otherwise the final set of correction parameters $(A_p,B_p)$ is set to be the fifth set of correction parameters.

10. The method for in-phase and quadrature mismatch calibration of a transmitter as claimed in claim 9, wherein the final set of correction parameters $(A_p,B_p)$ is set to be the fourth set of correction parameters if $W^{(4)}(-f_T)/W^{(4)}(f_T)$ is less than $W^{(5)}(-f_T)/W^{(5)}(f_T)$, otherwise the final set of correction parameters $(A_p,B_p)$ is set to be the fifth set of correction parameters.

11. The method for in-phase and quadrature mismatch calibration of a transmitter as claimed in claim 1, further comprising the following steps:

further adding an DC compensation parameter $\gamma_p$ while obtaining the corrected signal $x_c[n]$ such that $x_c[n]=A_p\cdot(x[n]+\gamma_p)+B_p\cdot(x[n]+\gamma_p)^*;$ obtaining a first local leakage component measure $L_1$ from the modulated signal $x_m(t)$ with the final set of parameters $A_p$ and $B_p$, and the parameter $\gamma_p=\zeta_1$, where $\zeta_1$ is a real number;

obtaining a second local leakage component measure $L_2$ from the modulated signal $x_m(t)$ with the final set of parameters $A_p$ and $B_p$, and the parameter $\gamma_p=\zeta_2$, where $\zeta_2$ is a real number;

obtaining a third local leakage component measure $L_3$ from the modulated signal $x_m(t)$ with the final set of parameters $A_p$ and $B_p$, and the parameter $\gamma_p=j\zeta_1$;

obtaining a fourth local leakage component measure $L_4$ from the modulated signal $x_m(t)$ with the final set of parameters $A_p$ and $B_p$, and the parameter $\gamma_p=j\zeta_2$;

obtaining a fifth local leakage component measure $L_5$ from the modulated signal $x_m(t)$ with the final set of parameters $A_p$ and $B_p$, and the parameter $\gamma_p=0$; and obtaining a final DC compensation parameter $\gamma_{p,final}$ based on the first local leakage component measure $L_1$, the second local leakage component measure $L_2$, the third local leakage component measure $L_3$, the fourth local leakage component measure $L_4$ and the fifth local leakage component measure $L_5$.

12. The method for in-phase and quadrature mismatch calibration of a transmitter as claimed in claim 11, wherein the final DC compensation parameter $\gamma_{p,final}$ is obtained by $$\gamma_{p,final} = -\frac{1}{2} \cdot \frac{\zeta_2^2(L_1 - L_5) - \zeta_1^2(L_2 - L_5)}{\zeta_1(L_2 - L_5) - \zeta_2(L_1 - L_5)} -$$
$$j\frac{1}{2} \cdot \frac{\zeta_2^2(L_3 - L_5) - \zeta_1^2(L_4 - L_5)}{\zeta_1(L_4 - L_5) - \zeta_2(L_3 - L_5)}.$$

13. An apparatus for in-phase and quadrature mismatch calibration of a transmitter, comprising:
   a signal generator for generating a discrete-time signal $x[n]=x(n \cdot T_s)$, wherein $x(t)=e^{j2\pi f_T t}$ and $f_\square$ and $T_s$ are real numbers;
   a correction module for receiving the discrete-time signal $x[n]$ and obtaining a corrected signal $x_c[n]$ based on the test signal $x[n]$ and a set of correction parameters $A_p$ and $B_p$, wherein $x_c[n]=A_p \cdot x[n]+B_p \cdot x^*[n]$;

a first and second D/A converter converting the corrected signal $x_c[n]$ to an analog signal $x_c(t)$, wherein the first D/A converter converts the real part of the corrected signal to a real part of the analog signal, and the second D/A converter converts the imaginary part of the corrected signal to an imaginary part of the analog signal;
   a modulator applying in-phase and quadrature modulation to the analog signal $x_c(t)$, and outputting a modulated signal $x_m(t)$;
   a measurer configured to:
   obtain a first desired component measure $W^{(1)}(f_T)$ and a first image component measure $W^{(1)}(-f_T)$ from the modulated signal $x_m(t)$ with a first set of the correction parameters $A_p$ and $B_p$;
   obtain a second desired component measure $W^{(2)}(f_T)$ and a second image component measure $W^{(2)}(-f_T)$ from the modulated signal $x_m(t)$ with a second set of the correction parameters $A_p$ and $B_p$;
   obtain a third desired component measure $W^{(3)}(f_T)$ and a third image component measure $W^{(3)}(-f_T)$ from the modulated signal $x_m(t)$ with a third set of the correction parameters $A_p$ and $B_p$;
   obtain a fourth desired component measure $W^{(4)}(f_T)$ and a fourth image component measure $W^{(4)}(-f_T)$ from the modulated signal $x_m(t)$ with a fourth set of correction parameters $A_p$ and $B_p$; and
   obtain a fifth desired component measure $W^{(5)}(f_T)$ and a fifth image component measure $W^{(5)}(-f_T)$ from the modulated signal $x_m(t)$ with a fifth set of correction parameters $A_p$ and $B_p$; and
   a processor configured to:
   obtain the fourth and fifth sets of correction parameters $A_p$ and $B_p$ based on the first, the second, and the third desired component measures as well as the first, the second, and the third image component measures; and
   choose a final set of correction parameters $A_p$ and $B_p$ from the fourth and fifth sets of correction parameters.

14. The apparatus for in-phase and quadrature mismatch calibration of a transmitter as claimed in claim 13, wherein the first set of correction parameters $(A_p,B_p)=(a,0)$, the second set of correction parameters $(A_p,B_p)=(b,b)$, and the third set of correction parameters $(A_p,B_p)=(b,-b)$, where a and b are real numbers.

15. The apparatus for in-phase and quadrature mismatch calibration of a transmitter as claimed in claim 14, wherein the parameter a is 1 and the parameter b is ½.

16. The apparatus for in-phase and quadrature mismatch calibration of a transmitter as claimed in claim 13, wherein the fourth set of correction parameters $(A_p,B_p)$ are obtained by $A_p=\sqrt{P}-j\hat{\alpha}\sqrt{Q}$ $B_p=-\hat{\alpha}\sqrt{P}-j\sqrt{Q}$ and the fifth set of correction parameters $(A_p,B_p)$ are obtained by $A_p=\sqrt{P}+j\hat{\alpha}\sqrt{Q}$ $B_p=-\hat{\alpha}\sqrt{P}+j\sqrt{Q}$ where $$\alpha \approx \hat{\alpha} = \frac{\sqrt{N/O}-1}{\sqrt{N/O}+1},$$

$N = (W^{(2)}(f_T) + W^{(2)}(-f_T))/2,$ $O = (W^{(3)}(f_T) + W^{(3)}(-f_T))/2,$ $$Q = \frac{\hat{\alpha}^2 - \rho^{(1)}}{(1+\rho^{(1)})(\hat{\alpha}^2 - 1)},$$

$P = 1 - Q,$ $$\rho^{(1)} = \frac{W^{(1)}(-f_T)}{W^{(1)}(f_T)}.$$

17. The apparatus for in-phase and quadrature mismatch calibration of a transmitter as claimed in claim 13, wherein the final set of correction parameters $(A_p,B_p)$ is set to be the fourth set of correction parameters if a function of $W^{(4)}(-f_T)$ is less than the function of $W^{(5)}(-f_T)$, otherwise the final set of correction parameters $(A_p,B_p)$ is set to be the fifth set of correction parameters.

18. The apparatus for in-phase and quadrature mismatch calibration of a transmitter as claimed in claim 17, wherein the final set of correction parameters $(A_p,B_p)$ is set to be the fourth set of correction parameters if a value of $W^{(4)}(-f_T)$ is less than a value of $W^{(5)}(-f_T)$, otherwise the final set of correction parameters $(A_p,B_p)$ is set to be the fifth set of correction parameters.

19. The apparatus for in-phase and quadrature mismatch calibration of a transmitter as claimed in claim 13, wherein the final set of correction parameters $(A_p,B_p)$ is set to be the fourth set of correction parameters if a function of $W^{(4)}(-f_T)$ is greater than the function of $W^{(5)}(f_T)$, otherwise the final set of correction parameters $(A_p,B_p)$ is set to be the fifth set of correction parameters.

20. The apparatus for in-phase and quadrature mismatch calibration of a transmitter as claimed in claim 19, wherein the final set of correction parameters $(A_p,B_p)$ is set to be the fourth set of correction parameters if a value of $W^{(4)}(f_T)$ is greater than a value of $W^{(5)}(f_T)$, otherwise the final set of correction parameters $(A_p,B_p)$ is set to be the fifth set of correction parameters.

21. The apparatus for in-phase and quadrature mismatch calibration of a transmitter as claimed in claim 13, wherein the final set of correction parameters $(A_p,B_p)$ is set to be the fourth set of correction parameters if a function of $W^{(4)}(-f_T)$ and $W^{(4)}(f_T)$ is less than the function of $W^{(5)}(-f_T)$ and $W^{(5)}(f_T)$, otherwise the final set of correction parameters $(A_p,B_p)$ is set to be the fifth set of correction parameters.

22. The apparatus for in-phase and quadrature mismatch calibration of a transmitter as claimed in claim 21, wherein the final set of correction parameters $(A_p, B_p)$ is set to be the fourth set of correction parameters if $W^{(4)}(-f_T)/W^{(4)}(f_T)$ is less than $W^{(5)}(-f_T)/W^{(5)}(f_T)$, otherwise the final set of correction parameters $(A_p, B_p)$ is set to be the fifth set of correction parameters.

23. The apparatus for in-phase and quadrature mismatch calibration of a transmitter as claimed in claim 13, wherein the processor further configured to:

further add an DC compensation parameter $\gamma_p$ while obtaining the corrected signal $x_c[n]$ such that $$x_c[n] = A_p \cdot (x[n] + \gamma_p) + B_p \cdot (x[n] + \gamma_p)^*;$$

obtain a first local leakage component measure $L_1$ from the modulated signal $x_m(t)$ with the final set of parameters $A_p$ and $B_p$, and the parameter $\gamma_p = \zeta_1$, where $\zeta_1$ is a real number;

obtain a second local leakage component measure $L_2$ from the modulated signal $x_m(t)$ with the final set of parameters $A_p$ and $B_p$, and the parameter $\gamma_p \zeta_2$, where $\zeta_2$ is a real number;

obtain a third local leakage component measure $L_3$ from the modulated signal $x_m(t)$ with the final set of parameters $A_p$ and $B_p$, and the parameter $\gamma_p = j\zeta_1$;

obtain a fourth local leakage component measure $L_4$ from the modulated signal $x_m(t)$ with the final set of parameters $A_p$ and $B_p$, and the parameter $\gamma_p = j\zeta_2$;

obtain a fifth local leakage component measure $L_5$ from the modulated signal $x_m(t)$ with the final set of parameters $A_p$ and $B_p$, and the parameter $\gamma_p = 0$; and obtain a final DC compensation parameter $\gamma_{p,final}$ based on the first local leakage component measure $L_1$, the second local leakage component measure $L_2$, the third local leakage component measure $L_3$, the fourth local leakage component measure $L_4$ and the fifth local leakage component measure $L_5$.

24. The apparatus for in-phase and quadrature mismatch calibration of a transmitter as claimed in claim 23, wherein the final DC compensation parameter $\gamma_{p,final}$ is obtained by $$\gamma_{p,final} = -\frac{1}{2} \cdot \frac{\zeta_2^2(L_1 - L_5) - \zeta_1^2(L_2 - L_5)}{\zeta_1(L_2 - L_5) - \zeta_2(L_1 - L_5)} - j\frac{1}{2} \cdot \frac{\zeta_2^2(L_3 - L_5) - \zeta_1^2(L_4 - L_5)}{\zeta_1(L_4 - L_5) - \zeta_2(L_3 - L_5)}.$$

* * * * *